Patented Apr. 27, 1943

2,317,505

UNITED STATES PATENT OFFICE 2,317,505

COMPOSITION FOR REMOVING WALLPAPER

Helen Erma Wassell, Pittsburgh, Pa., assignor to Carbide and Carbon Chemicals Corporation, a corporation of New York No Drawing. Application July 30, 1940,
Serial No. 348,597

2 Claims. (Cl. 252—161)

This invention is concerned with the removal of wallpaper from the usual plaster or wooden surfaces to which it is affixed. The invention includes a method of removing wallpaper by means of novel penetrant solutions which wet and loosen the paper to permit it to be quickly and easily detached without damage to the wall.

Wallpaper is commonly removed by wetting it with water until the adhesive (usually a starch base paste) is softened sufficiently to permit the paper to be scraped off. The water may be brushed or hand sprayed onto the paper, and not infrequently many applications and a long time are required to wet the paper (and adhesive) sufficiently to cause it to be loosened enough for removal without injury to the underlying wall surface. Moreover, where there are a number of superimposed layers of wallpaper, or in the case of certain types of wallpaper, it is practically impossible to obtain adequate wetting by means of water alone. Wallpaper also may be removed by means of special steaming equipment by which water is forced through the paper by means of heat and pressure. The use of such steaming devices enables the removal of the wallpaper to proceed more rapidly, but the special equipment required involves added expense and requires considerable care in operation because the use of excessive steam or too great a pressure will crack and injure plaster walls. Also, the finish of woodwork and painted surfaces is quickly attacked by the steam.

The present invention achieves its object of enabling wallpaper to be quickly and thoroughly wetted and loosened without the use of steam or special equipment by employing special wetting solutions. The solutions used comprise small amounts, say, about 2% to about 5% by volume of the monobutyl ethers of ethylene or diethylene glycol dissolved in water. These solutions, when applied to wallpaper in the usual way, have been found to penetrate and wet the paper thoroughly in a very short time, usually about 5 to 10 seconds, and only a single application is required in most cases.

It was also found that still better results were obtained if a portion of the monobutyl ether of ethylene or diethylene glycol was replaced by a small amount of a salt of a higher primary or secondary aliphatic alcohol sulfate. The aqueous solutions containing mixtures of one of the glycol ethers named with such a higher alcohol sulfate salt produced more rapid penetration than was obtained with aqueous solutions of the glycol ethers alone (or, for that matter, of the alcohol sulfate salts alone).

Particularly useful wallpaper penetrants were formed of aqueous solutions containing between 2% and 5% by volume of a mixture of ethylene glycol monobutyl ether and the sodium salt of monooctyl (2-ethyl hexyl) sulfate. The proportions of the glycol ether and alcohol sulfate salt in the mixture ranged from 40 to 60 parts of one to 60 to 40 parts of the other.

These solutions were applied to wallpaper by means of a brush and by a hand spray until the surface was evenly covered. After a brief period allowed for complete penetration, the paper was easily stripped from the wall.

The concentration of the penetrant or mixture of penetrants in the solution may vary over a fairly wide range, but usually from 2% to 5% is satisfactory, and the exact concentration is determined by the difficulty of adequately penetrating the particular wallpaper to be treated.

Many other alcohol sulfate salts may be used in place of the sodium octyl sulfate mentioned, and satisfactory results have been obtained with corresponding salts of branched chain secondary alcohol sulfates of fourteen and of seventeen carbon atoms. Other primary higher alcohol sulfates similarly may be used.

While the invention has special utility for the removal of wallpaper from the usual surfaces, its utility is in no wise confined to this. On the contrary, the penetrant described is highly effective for wetting and removing fabrics and other fibrous materials from surfaces to which they are affixed, for instance wood, glass, paper, metals and the like.

Modifications of the composition and in the mode of using the novel penetrants will be apparent and such modifications are included within the invention as defined by the appended claims.

I claim:

1. A penetrant composition for quickly wetting and loosening wallpaper sufficiently to permit the removal of the wallpaper from a surface to which it is adhered without injury to said surface, said penetrant composition essentially comprising an aqueous solution of from about 2% to about 5% by volume of a penetrant agent consisting of a mixture of from about 40 to about 60 parts of at least one of the group consisting of the monobutyl ethers of ethylene glycol and diethylene glycol with from about 60 to about 40 parts of a water-soluble salt of a branched-chain secondary aliphatic alcohol sulfate having from 14 to 17 carbon atoms to the molecule.

2. A penetrant composition for quickly wetting and loosening wallpaper sufficiently to permit the removal of the wallpaper from a surface to which it is adhered without injury to said surface, said penetrant composition essentially comprising an aqueous solution of from about 2% to about 5% by volume of a penetrant agent consisting of a mixture of from about 40 to about 60 parts of a monobutyl ether of the group consisting of the monobutyl ethers of ethylene glycol and diethylene glycol with from about 60 to about 40 parts of sodium octyl sulfate.

HELEN E. WASSELL.